US011344014B2

(12) United States Patent
Wang et al.

(10) Patent No.: US 11,344,014 B2
(45) Date of Patent: May 31, 2022

(54) METHOD FOR CONTROLLING ELECTRONIC ALARM FOR A FISHING REEL AND ELECTRONIC ALARM SYSTEM FOR A FISHING REEL (71) Applicant: WEIHAI LANGBAO FISHING TACKLE CO., LTD., Weihai (CN)

(72) Inventors: Xiren Wang, Weihai (CN); Zongfeng Shao, Weihai (CN)

(73) Assignee: WEIHAI LANGBAO FISHING TACKLE CO., LTD., Weihai (CN)

( * ) Notice: Subject to any disclaimer, the term of this patent is extended or adjusted under 35 U.S.C. 154(b) by 273 days.

(21) Appl. No.: 16/796,887

(22) Filed: Feb. 20, 2020

(65) Prior Publication Data
US 2020/0267956 A1    Aug. 27, 2020

(30) Foreign Application Priority Data

Feb. 22, 2019    (JP) .............................. 2019-000615 U (51) Int. Cl.
| *A01K 89/00* | (2006.01) |
| *A01K 89/015* | (2006.01) |
| *A01K 97/12* | (2006.01) |
| *G08B 21/18* | (2006.01) |
| *G08B 3/10* | (2006.01) |

(52) U.S. Cl.
CPC ........ *A01K 89/0178* (2015.05); *A01K 97/125* (2013.01); *G08B 3/10* (2013.01); *G08B 21/182* (2013.01)

(58) Field of Classification Search
CPC .... A01K 89/0178; A01K 97/125; G08B 3/10; G08B 21/182
See application file for complete search history.

(56) References Cited

U.S. PATENT DOCUMENTS

| 5,228,228 | A | * | 7/1993 | Meissner | ............. | A01K 97/125 |
| | | | | | | 43/17 |
| 5,867,931 | A | * | 2/1999 | Morris | ................. | A01K 97/125 |
| | | | | | | 43/17 |
| 6,966,140 | B1 | * | 11/2005 | Rozkowski | .......... | A01K 97/125 |
| | | | | | | 43/17 |
| 9,055,736 | B1 | * | 6/2015 | DeLucca | ................ | A01K 93/02 |
| 2005/0011105 | A1 | * | 1/2005 | Cameron | ............. | A01K 97/125 |
| | | | | | | 43/17 |

(Continued)

FOREIGN PATENT DOCUMENTS

| CN | 102077814 | 6/2011 |
| JP | 3222261 | 7/2019 |

*Primary Examiner* — Ojiako K Nwugo
(74) *Attorney, Agent, or Firm* — JCIPRNET (57) ABSTRACT A method(s) for controlling electronic alarm for a fishing reel and an electronic alarm system(s) for a fishing reel are provided. The method includes the steps of: detecting a current point based on rotational movement of the fishing reel; determining whether a button provided in the fishing reel is pressed for a first period of time; memorizing a current point at a time when the button is pressed for the first period of time as a target point; during a fishing line casting period after the casting period that the target point is memorized, detecting a current point based on rotational movement of the fishing reel; determining whether a current point is the target point; and sounding an arrival alarm by the buzzer when the current point is the target point.

14 Claims, 8 Drawing Sheets

(56) References Cited

U.S. PATENT DOCUMENTS

| | | | |
|---|---|---|---|
| 2007/0017141 A1* | 1/2007 | Coulman | A01K 97/01 43/17 |
| 2007/0266615 A1* | 11/2007 | Norman | A01K 91/065 43/19.2 |
| 2016/0100564 A1* | 4/2016 | Perez | A01K 97/10 43/4.5 |
| 2018/0213761 A1* | 8/2018 | Carkner | A01K 97/125 |
| 2018/0343845 A1* | 12/2018 | Shen | A01K 89/033 |
| 2019/0037825 A1* | 2/2019 | Du Plooy | A01K 87/007 |

\* cited by examiner

METHOD FOR CONTROLLING ELECTRONIC ALARM FOR A FISHING REEL AND ELECTRONIC ALARM SYSTEM FOR A FISHING REEL

CROSS-REFERENCE TO RELATED APPLICATIONS

This application claims the benefit of priority based on Japanese Utility Model Application No. 2019-615, which is a prior application filed on Feb. 22, 2019. The entire contents of which are incorporated herein by reference.

FIELD OF THE INVENTION

The present disclosure relates to fishing gear, and more particularly to a method for controlling an electronic alarm for a fishing reel and an electronic alarm system for a fishing reel.

BACKGROUND OF THE INVENTION

Fish habitats vary with changes in the food chain, and different types of fish have different water depths for their habitats. Usually, after finding the fishing depth at which fish can be caught, when the lead of the fishing line is thrown again, the fishing line is preferably unwound so as to be able to reach the exact same depth in order to find the fish accurately and to increase the probability that the fish can be caught. In the case of a conventional fishing reel, an angler usually remembers the color of the fishing line or fishes by estimating the depth of the fish's habitat by marking it with these methods having a low probability of catching fish. In the case of a fishing reel with a digital display (Patent Document 1), the depths of fish can be memorized, and the angler need only to memorize the length of the fishing line displayed on the LCD screen; and each time a fishing line is fed into a memory meter, fish can be found and the same kind of fish can be caught easily.

However, the fishing reel with digital display has the following disadvantages; first, focusing attention on the length of the fishing line shown on the LCD screen is necessary in order to respond immediately while feeding the fishing line. Also, the LCD screen needs to be accurately positioned in the housing during installation, and improper positioning can cause the screen to break and affect use, resulting in waste and susceptibility of the LCD screen to damage during use. Furthermore, if using a fishing reel with a digital display, the size is relatively large and the cost becomes high.

[Patent Document 1] Chinese Patent Application Publication No. CN 102077814A

SUMMARY OF THE INVENTION

The present disclosure has been made by considering the above problems, and an object of the disclosure is to provide a method for controlling an electronic alarm for a fishing reel and an electronic alarm system for a fishing reel which can accurately memorize the depth of the water for catching fish without the need to pay attention to an LCD screen for a long period of time, and which automatically sound an alarm when reaching the depth of the habitat area of a target fish at the time the fishing line is unwound again, and are able to inform an angler that the position of a school of fish has been reached.

In order to solve the above technical problem, the embodiments are grasped by the following configuration.

As a means for solving the aforementioned problem, one aspect of the present invention is a method for controlling an electronic alarm for a fishing reel, the method comprising the steps of: detecting, by a single chip microcomputer provided in the fishing reel, a current point based on rotational movement of the fishing reel; determining, by the single chip microcomputer, whether a button provided in the fishing reel is pressed for a first period of time; memorizing, by the single chip microcomputer, a current point at a time when the button is pressed for the first period of time as a target point; during a fishing line casting period after the fishing line casting period that the target point is memorized, detecting, by the single chip microcomputer, a current point based on rotational movement of the fishing reel; determining, by the single chip microcomputer, whether a current point is the target point; and sounding an arrival alarm by the buzzer when the current point is the target point.

Another aspect of the present invention is an electronic alarm system for a fishing reel comprising a single chip microcomputer with at least one memory, at least one sensor capable of converting rotational movements of the fishing reel to at least one electrical detection signal, the at least one sensor electrically coupled with the single chip microcomputer so as to be able to send the at least one electrical detection signal to the single chip microcomputer, at least one button electrically coupled with the single chip microcomputer so as to be able to receive at least one operation by a user, at least one buzzer electrically coupled with the single chip microcomputer so as to be able to sound at least one alarm in response to at least one instruction from the single chip microcomputer; and at least one battery configured to supply the single chip microcomputer and the at least one sensor and the at least one buzzer with electric power, wherein the single chip microcomputer is able to: detect a current point based on rotational movement of the fishing reel by receiving and analyzing the at least one electrical detection signal from the at least one rotational sensor; determine whether the at least one button provided in the fishing reel is pressed for a first period of time; memorize a current point at a time when the button is pressed for the first period of time as a target point; during a fishing line casting period after the fishing line casting period that the target point is memorized, detect a current point based on rotational movement of the fishing reel; determine whether a current point is the target point; and send at least one instruction to the buzzer to sound an arrival alarm when the current point is the target point.

According to the aspects, a method for controlling electronic alarm for a fishing reel and an electronic alarm system for a fishing reel can be provided which can accurately memorize the depth of the water for catching fish without the need to pay attention to an LCD screen for a long period of time, and which automatically sound an alarm when reaching the depth of the habitat area of a target fish at the time the fishing line is unwound again, and are able to inform an angler that the position of a school of fish has been reached. The present embodiments have a simple structure and is easy to operate. The fishing reel can be made compact and can be manufactured at a low cost.

DESCRIPTION OF PREFERRED EMBODIMENTS

Hereinafter, based on preferred embodiments according to the present disclosure, the embodiments will be described in detail with reference to the drawings. These are listed for illustrative purposes and do not limit the present disclosure. The same numbers are given to the same elements throughout the description of the embodiments.

As shown in FIGS. 1-4, the memorized water depth electronic alarm for a fishing reel according to an embodiment of the present disclosure comprises one or more induction magnets 21 for detecting rotation of a fishing reel, and a sensor 16 which receives a signal of the rotation of the one or more induction magnets 21, wherein the one or more induction magnets 21 can be arranged on a wire wheel 19 in a rotational direction of the fishing reel or on a part having a communicable relationship with the wire wheel 19.

The memorized water depth electronic alarm for a fishing reel according to the present embodiment comprises, furthermore, a first housing 1, a button 2, a first circuit board 3, a second circuit board 7, a first cover 5, a second housing 6, a battery 13, a single chip microcomputer 17, a first seal ring 4, a second cover 9, and a buzzer 12, wherein one end of the button 2 protrudes from the first housing 1 through a mounting hole 1a provided for the button 2 in the first housing 1, the other end is connected to the first circuit board 3, and the single chip microcomputer 17 is connected to the first circuit board 3, wherein after the button 2, the first circuit board 3, and the single chip microcomputer 17 are fixed in the first housing 1, a first cover 5 is assembled with the first housing 1, and the first seal ring 4 is mounted in a seal groove provided in the first housing 1, and wherein the first cover 5 presses on the first seal ring 4 and is fixed to the first housing 1 by screws 15 to form a first assembly 30.

Figure 1:
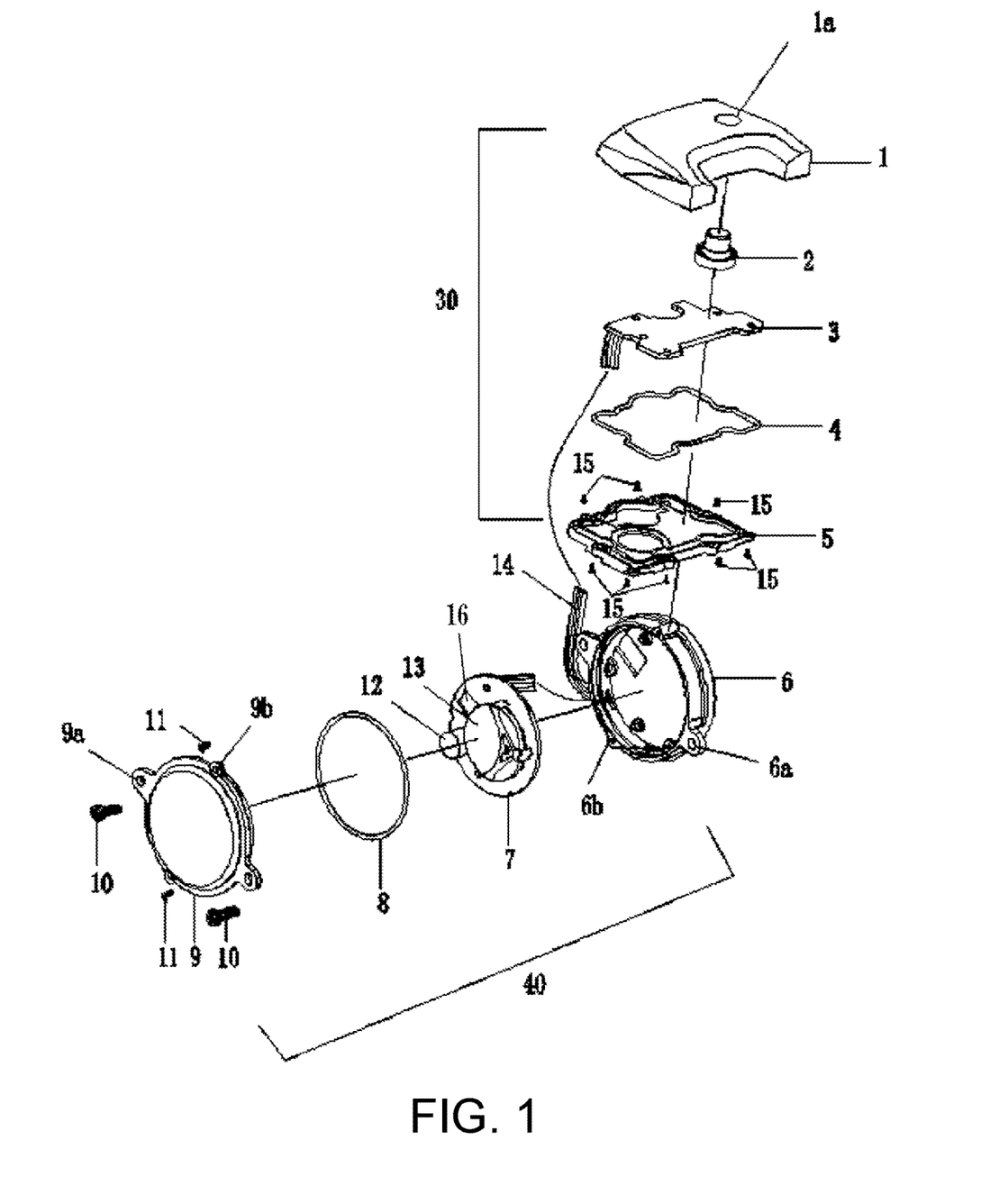
FIG. 1 is an exploded perspective view of a memorized water depth electronic alarm for a fishing reel according to a first embodiment.
Figure 2:
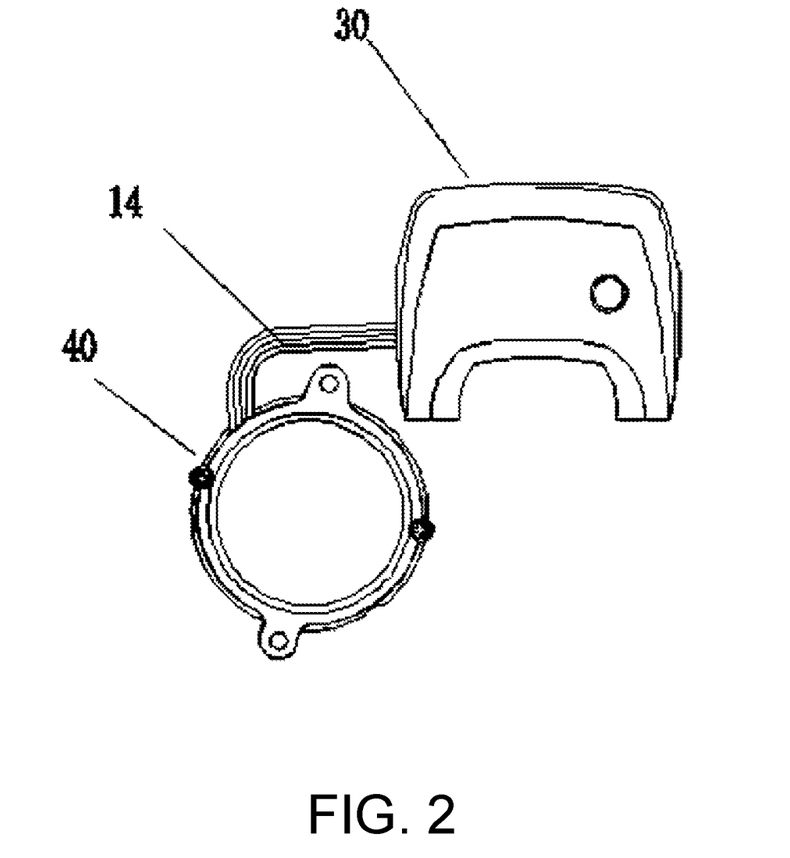
FIG. 2 is a schematic view after assembly of a memorized water depth electronic alarm for a fishing reel according to the first embodiment.

The battery 13 is fixed to the second circuit board 7; the sensor 16 is connected to the second circuit board 7; the second circuit board 7, the battery 13, and the sensor 16 are mounted in the second housing 6; the open side of the second housing 6 is sealed by the second cover 9; and the second circuit board 7 and the first circuit board 3 are connected by one or more data lines 14.

A second seal ring 8 is mounted in a seal groove provided in the second housing 6, and the second cover 9 presses on the second seal ring 8, and screws 11 pass through the screw holes 9b of the second cover 9 and the screw holes 6b of the second housing 6 to affix the second cover 9 and the second housing 6 to form a second assembly 40.

The buzzer 12 is connected to the first circuit board 3 and assembled to the first housing 1 together with the first circuit board 3; alternatively, the buzzer 12 is connected to the second circuit board 7 and assembled together with the second circuit board 7 in the second housing 6. FIG. 1 shows a case where the buzzer 12 is connected to the second circuit board 7.

The shape of the second housing 6 is the same as that of the end side of the wire wheel 19 of the fishing reel, and screws 10 pass through the screw holes 9a of the second cover 9 and the screw holes 6a of the second housing 6 to attach the second assembly 40 to the end side of the wire wheel. The second housing 6 also serves as a wire wheel cover such that space can be saved and the fishing reel can be reduced in size.

When the button 2 is pressed and power is supplied from the battery 13 to turn on the circuit, the single chip microcomputer 17 detects a power-on signal, receives a power-on command, and starts data analysis and processing, and then the memorized water depth electronic alarm of the fishing reel begins to operate.

Figure 3:
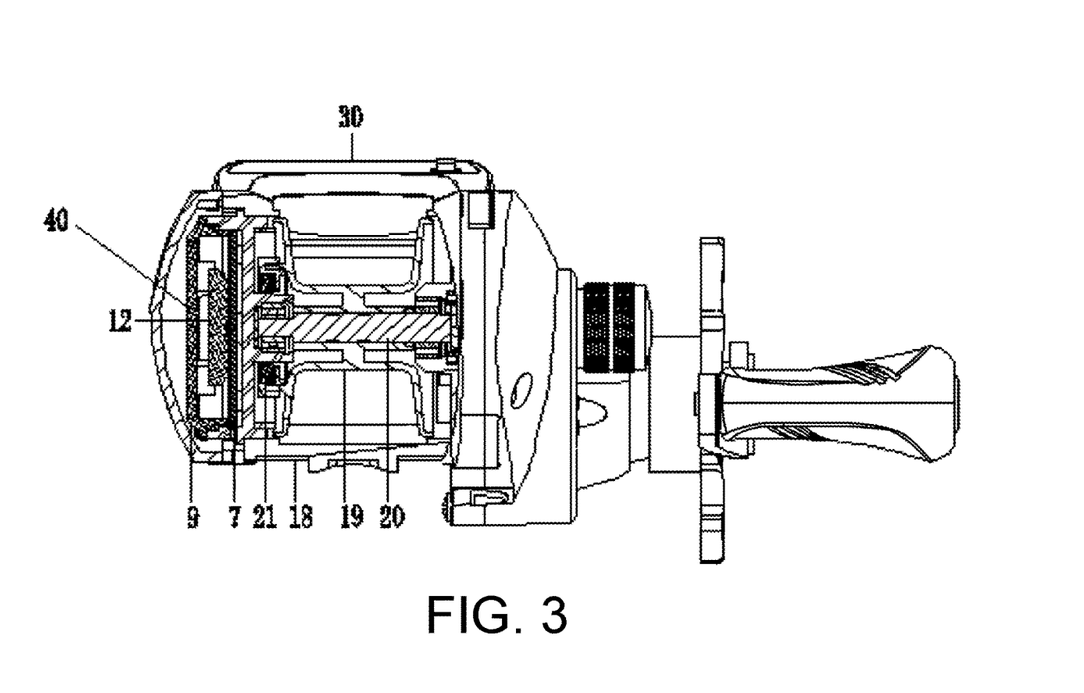
FIG. 3 is a schematic view according to the first embodiment of after the memorized water depth electronic alarm for a fishing reel has been assembled on a fishing reel.
Figure 4:
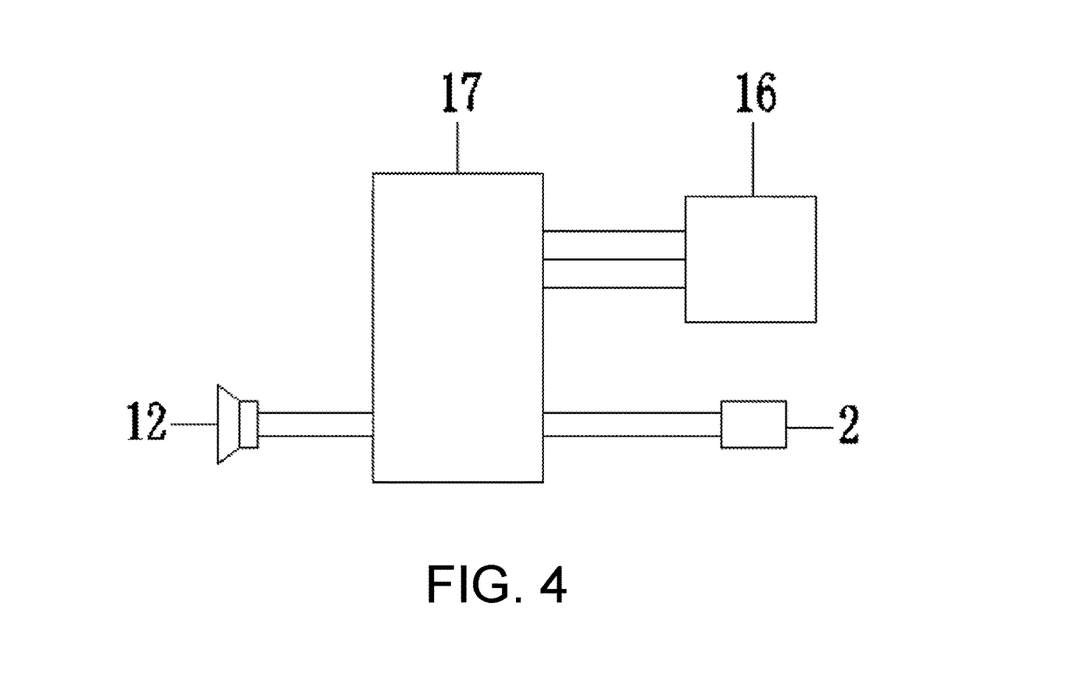
FIG. 4 is an operation principle diagram of a memorized water depth electronic alarm for a fishing reel according to the first embodiment.

The one or more induction magnets 21 are fixed to the wire wheel 19 of the fishing reel. The wire wheel 19 is fixed to a wire wheel shaft 20 and attached to the fishing reel holder 18 to drive the rotational motion of the one or more induction magnets 21. The sensor 16 detects the motion of the one or more induction magnets 21, converts the motion into one or more electric detection signals and transmits the one or more signals to the single chip microcomputer 17 where the one or more signals are processed. The single chip microcomputer 17 is able to be receive the electric detection signals from the sensor 16 and to determine the rotational movement of the wire reel 19 (fishing reel) by calculations and analysis based on the electric detection signals from the sensor 16. Then, depending on the analysis result, the single chip microcomputer 17 transmits a memorized water depth transmission command to the buzzer 12 with a value substantially indicating, approximating, or estimating the length of the unwound fishing line as the memorized water depth, and the buzzer 12 is then instructed to sound an alarm indicating that the memorized water depth has been reached.

Figure 5A:
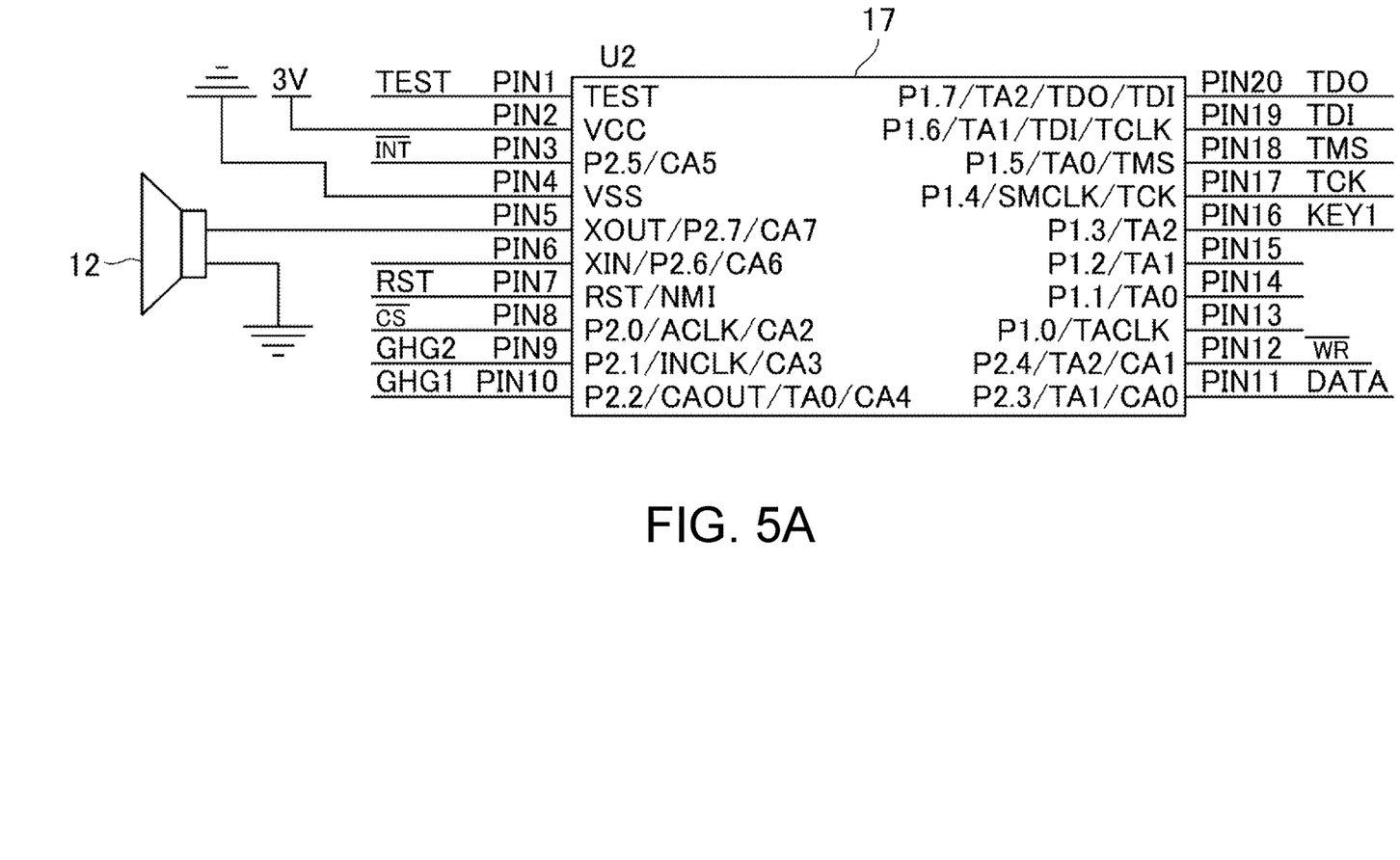
FIG. 5A is schematic view of a single chip microcomputer for a memorized water depth electronic alarm (an electronic alarm system) for a fishing reel according to the first embodiment.

In the present disclosure, circuit diagrams disclose the operation of the present embodiment. FIG. 5A illustrates a schematic diagram of the single chip microcomputer 17 as well as the buzzer 12. In the embodiment, the single chip microcomputer 17 has twenty different pins PIN1-PIN20 with each pin having a predetermined function. The single chip microcomputer 17 also has at least one memory to store any necessary information.

The buzzer 12 is electrically coupled with the single chip microcomputer 17 so as to be able to sound at least one alarm in response to at least one instruction from the single chip microcomputer 17. In the embodiment, the buzzer 12 is electrically connected to PIN5 and configured to receive instructions to sound the at least one alarm from the single chip microcomputer 17. A plurality of buzzers can be provided instead of one buzzer 12.

The battery 13 is configured to supply the single chip microcomputer 17, the sensor 16, and the buzzer 12 with electric power. The battery 13 is connected to a VCC pin PIN2 and a VSS pin PIN4 of the single chip microcomputer 17 to supply power to the single chip microcomputer 17. In the embodiment, the battery 13 is electrically coupled with all circuits requiring DC3V voltage. The present disclosure is not limited to the battery 13 of the current embodiment, and one or more types of power sources may be used as the battery 13 as long as the necessary power is able to be supplied to the necessary elements.

The button 2 is electrically coupled with the single chip microcomputer 17 so as to be able to transmit reception of at least one operation by a user to the single chip microcomputer. The button 2 is electrically connected to the single chip microcomputer 17 via a KEY1 pin PIN16 such that on/off signals from the button 2 may be input to the single chip microcomputer 17. Note that while this embodiment utilizes a button, any type of input means capable of detecting a user's operations can be used in place of a button. By performing an operation of pressing and releasing the button 2, the single chip microcomputer 17 can be initiated, terminated, or triggered. For example, by performing an operation of pressing and releasing the button 2, the single chip microcomputer 17 may start up, may shut down, may be triggered to detect a current point, or may memorize some current points as will be described below, in its built-in memory.

Figure 5B:
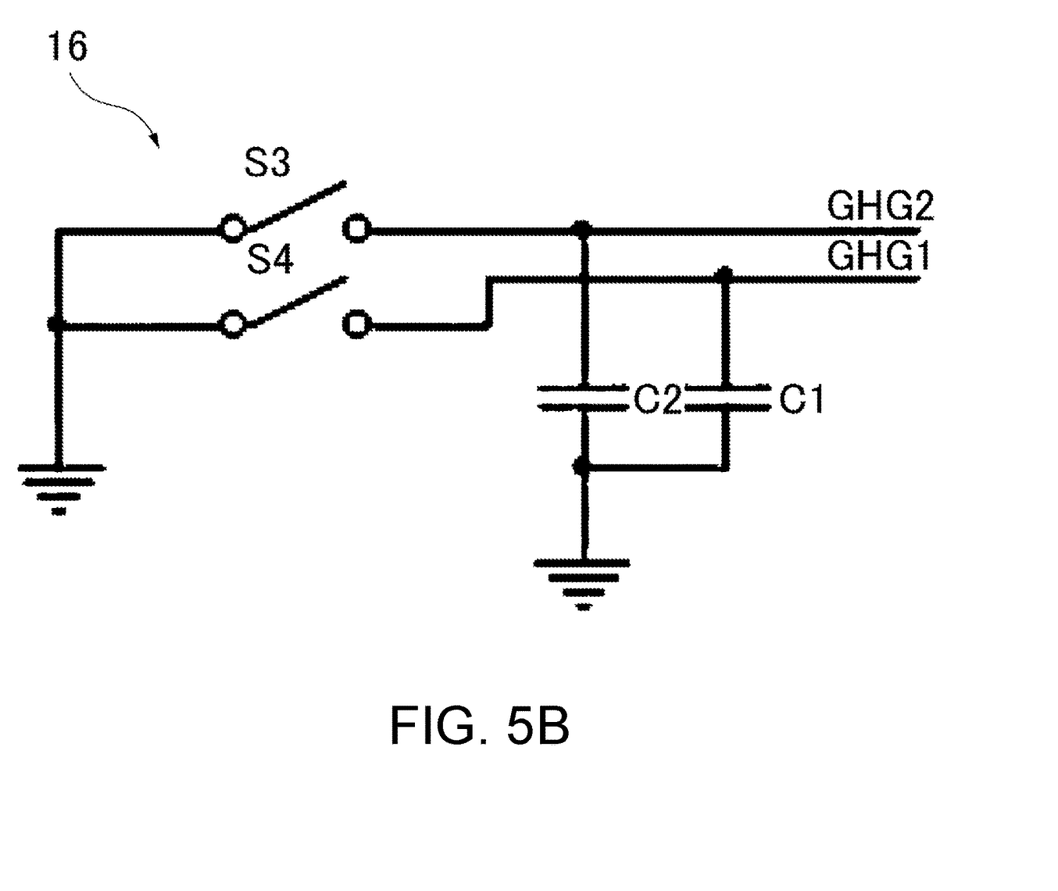
FIG. 5B is a circuit diagram for a sensor according to the first embodiment.

FIG. 5B is a circuit diagram for the sensor 16 according the present embodiment. The sensor 16 includes a first sensor capacitor C1, a second sensor capacitor C2, a first sensor reed switch S3, and a second sensor reed switch S4. The first sensor reed switch S3 and the second sensor capacitor C2 are connected in parallel with one end thereof being grounded, the other end thereof connected to a first pin PIN9 of the single chip microcomputer 17. The second sensor reed switch S4 and the first sensor capacitor C1 are connected in parallel with one end thereof being grounded, the other end thereof connected to a second pin PIN10 of the single chip microcomputer. Then, the sensor 16 generates detection signals and inputs the detection signals to the single chip microcomputer 17.

The first sensor reed switch S3 and the second sensor reed switch S4 are used to detect the position of the one or more induction magnets 21 (see FIG. 3). For example, in each of the first sensor reed switch S3 and the second sensor reed switch S4, a contactor (not illustrated) is provided and is operationally coupled with the corresponding reed switch S3 or S4. The contactors are disposed substantially adjacent to each other in a rotational direction so as to be able to face the one or more induction magnets 21.

When the one of the one or more induction magnets 21 is close to either the first sensor reed switch S3 or the second sensor reed switch S4, the contactor in the sensor 16 (the corresponding reed switch S3 or S4) causes the related signal line in FIG. 5B to close. When said induction magnet 21 moves away from the sensor 16, the contactor in the sensor 16 (the corresponding reed switch S3 or S4) causes the related signal line in FIG. 5B to open. In response to the operation of these switches, an electric detection signal is generated and sent to the single chip microcomputer 17. However, as long as a current point based on rotational movement of the fishing reel can be measured, any alternative means or detecting methods may also be used for the sensor 16.

The single chip microcomputer 17 is configured to analyze the electric detection signals and determine whether the fishing line is being unwound or rewound. In other words, the single chip microcomputer 17 is configured to determine the direction of rotation of the fishing reel based on the electric detection signals from the sensor 16.

With respect to the present embodiment, when the fishing line is being released, each of the one or more induction magnets 21 first reacts with the first sensor reed switch S3, and subsequently with the second sensor reed switch S4. Accordingly, the single chip microcomputer 17 receives a detection signal from the first sensor reed switch S3 first and then a detection signal from the second sensor reed switch S4. Based on this order the single chip microcomputer 17 determines that the fishing line is being released (unwound).

Conversely, when the fishing line is being rewound, the single chip microcomputer 17 receives a detection signal from the second sensor reed switch S4 first, and then a detection signal from the first sensor reed switch S3. Based on this order the single chip microcomputer 17 determines that the fishing line is being rewound.

Further, the single chip microcomputer 17 is configured to calculate and analyze the detection signals from the sensor 16 and determine a current point based on a value substantially indicating or approximating or estimating the length of the fishing line which is calculated using the detection signals. In the present embodiment, the number of the detection signals is counted and used as the value of the current point. The calculated current point or any related information can be memorized in the memory of the single chip microcomputer 17 or any other suitable memory.

The memorized water depth electronic alarm for a fishing reel of the present disclosure has only one button, and this button is an on/off switch and a memory switch; except for the shutdown operation, the memory function is activated once each time the button is pressed, a value substantially indicating or approximating or estimating the length of the fishing line at that time is memorized, and when the value of the fishing line is again unwound to the memorized water depth, the alarm is automatically sounded; thereby, informing the angler that the position of the school of fish has been reached.

Figure 6:
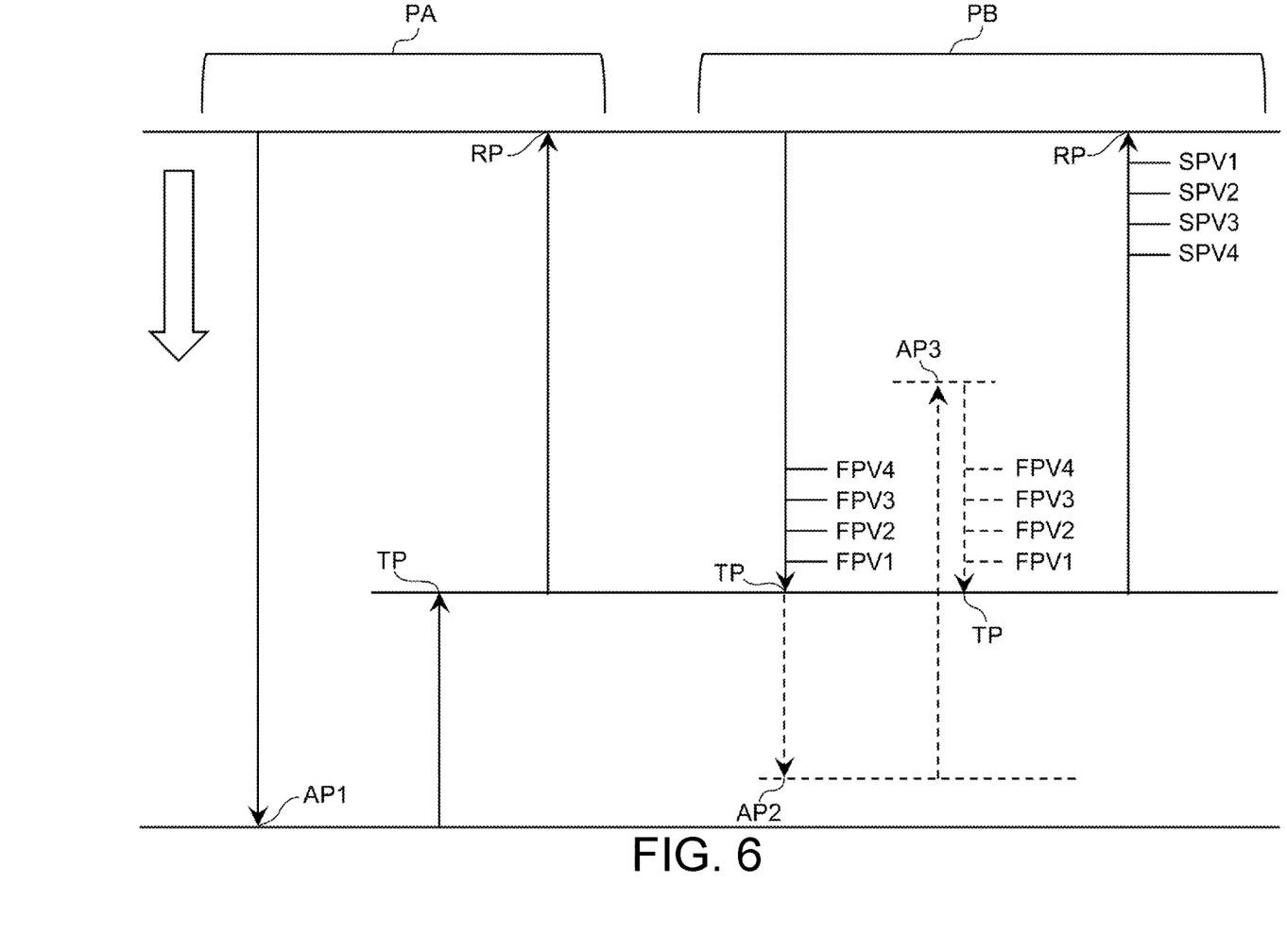
FIG. 6 is a schematic diagram representing two fishing line casting periods in the first embodiment.
Figure 7:
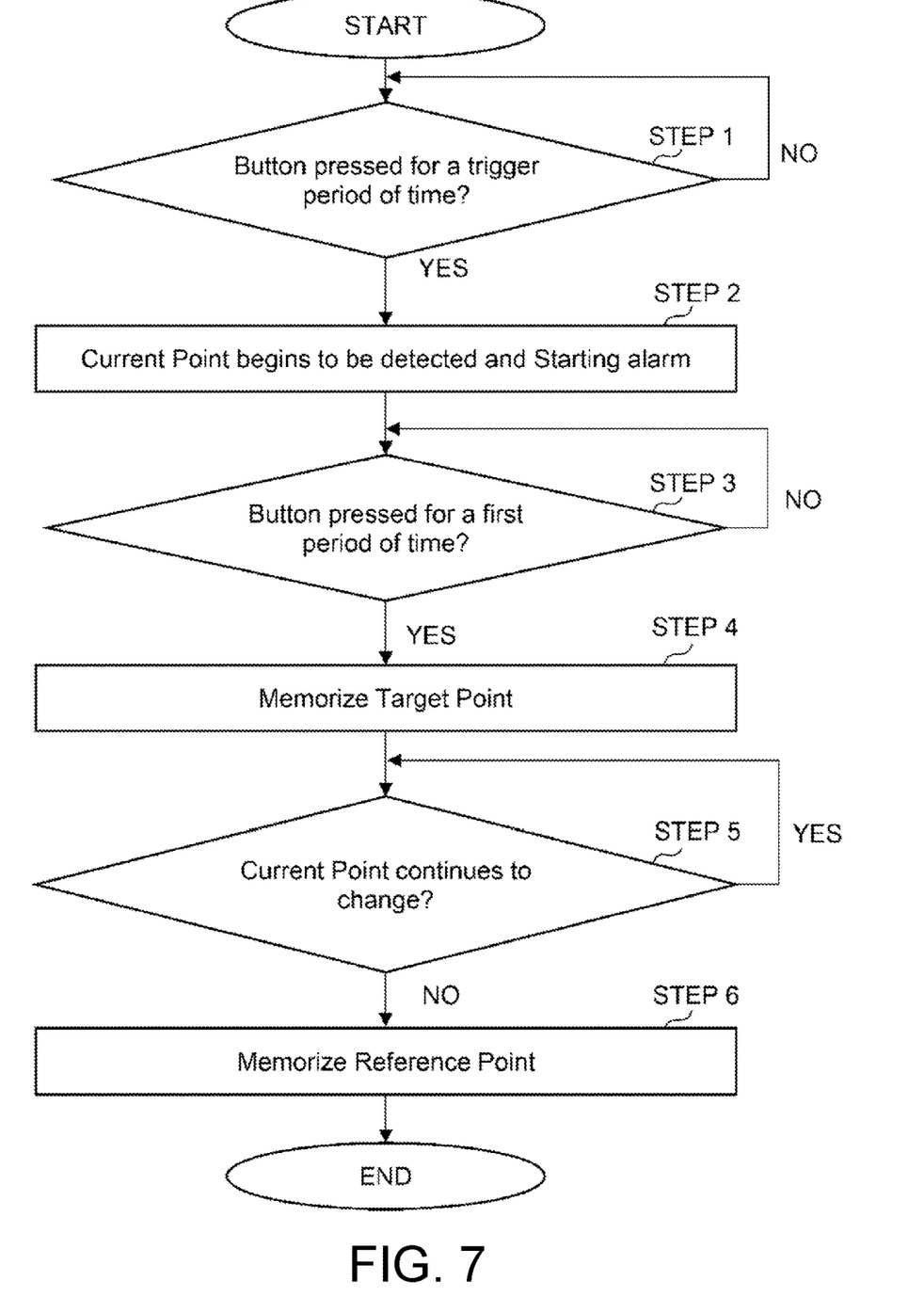
FIG. 7 is a flow chart representing the process for memorizing a target point and a reference point in the first embodiment.
Figure 8:
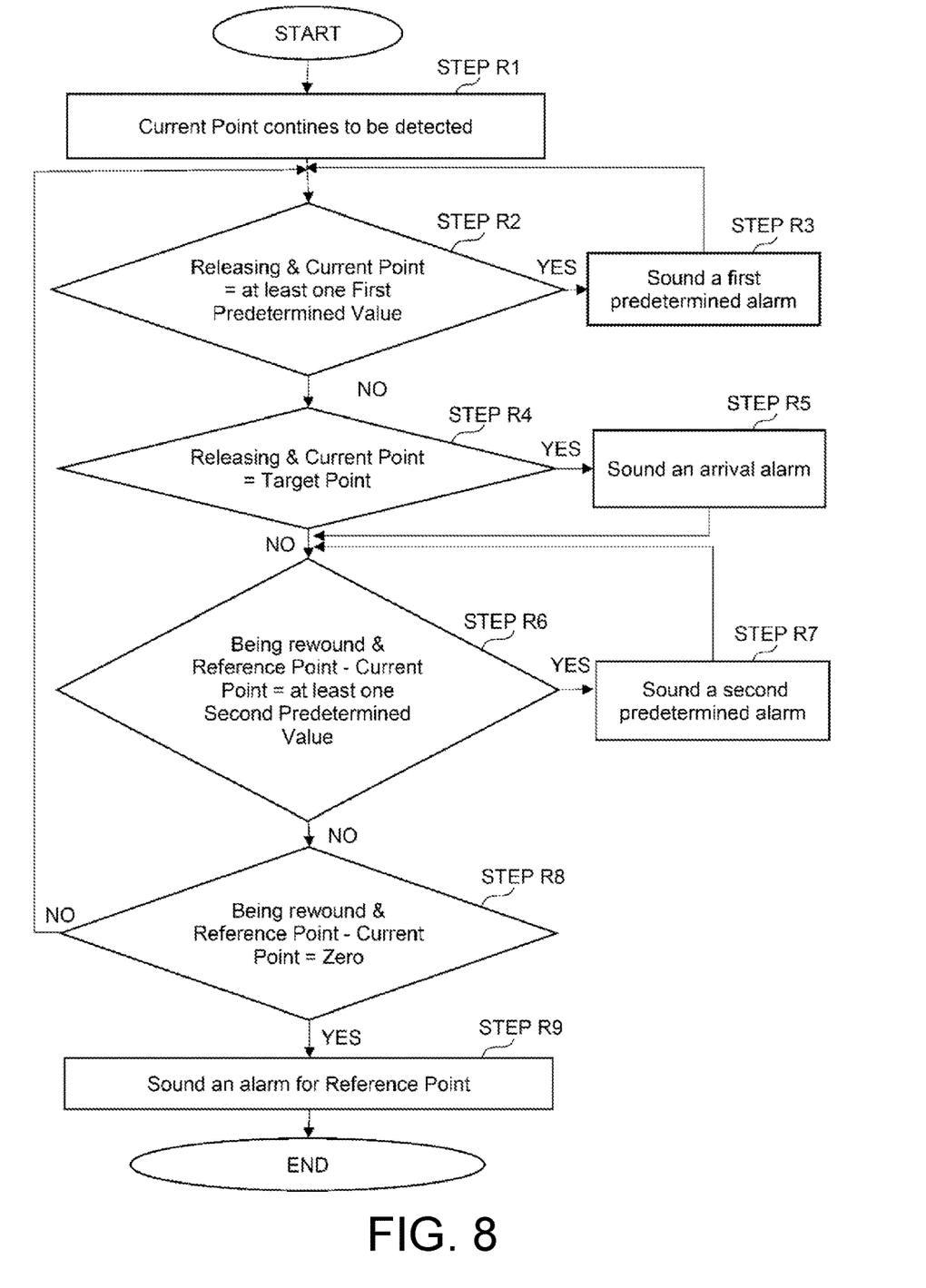
FIG. 8 is a flow chart representing the processes for using the target point and the reference point in the first embodiment.

FIG. 6 is a schematic diagram representing two fishing line casting periods in the first embodiment. FIG. 7 is a flow chart representing the process for memorizing a target point TP and a reference point RP in the first embodiment. FIG. 8 is a flow chart representing the processes for using the target point TP and the reference point RP in the first embodiment.

In FIG. 6, PA indicates a fishing line casting period that the target point TP is (to be) memorized and PB indicates a fishing line casting period after the casting period PA that the target point TP is memorized. In FIG. 6, a white arrow indicates a direction that the fishing line is released. FIG. 7 represents the processes during the fishing line casting period PA and FIG. 8 represents the processes the fishing line casting period PB after the casting period PA.

In order to operate the electronic alarm system for fishing, before releasing the fishing line the following process is used. As shown in FIG. 7, first, the single chip microcomputer 17 determines whether the button 2 is pressed down for a trigger period of time (e.g. 5 seconds) (STEP1). When the button 2 is pressed down for the trigger period of time (STEP 1, YES), the single chip microcomputer 17 sends instructions to the sensor 16 to start detection of the current point based on rotational movement of the fishing reel and sends instructions to the buzzer 12 to sound a starting alarm (e.g. 1 second) (STEP 2). The instructions for the sensor 16 and for the buzzer 12 may be sent substantially at the same time or separately. When the button 2 is not pressed for the trigger period of time (STEP 1, NO), the process returns to STEP 1.

The fishing line is then released in order to begin fishing. The single chip microcomputer 17 then determines whether the button 2 is pressed for a first period of time (e.g. 5 seconds) (STEP 3). When the button 2 is pressed for the first period of time (STEP 3, YES), the single chip microcomputer 17 memorizes the current point at a time when the button 2 is pressed for the first period of time as a target point TP (STEP 4). In this embodiment, in STEP3, the current point at the time when the button 2 is pressed is set to zero. That is, when an angler finds a position where one or more fish are present and presses the button 2 down, the target point TP is memorized in the memory. When the button 2 is not pressed for the first period of time (STEP 3, NO), the process returns to STEP 3 again.

In the casting period PA that the target point is memorized, while the angler is seeking fish, the current point arbitrarily changes in response to the angler's operation and/or the natural environment. That is, the angler can freely move a fishing hook or lure between the arbitrary positions at arbitrary times in arbitrary directions in the water until the angler finds a fish (e.g. until the angler realizes a fish's contact with the fishing gear, such as changes of tension or movement of the fishing line, movement of a fishing float, or the like) and then press the button 2 down. In FIG. 6, an arbitrary point AP1 just shows just one example of arbitrary points corresponding arbitrary positions.

After the target point TP is memorized, the single chip microcomputer 17 continues to detect the current point and determines whether the current point is stopped at a point different from the target point TP (STEP 5). While the current point continues to change (STEP 5, YES), the process returns to STEP 5 again. When the current point stops changing for a predetermined period of time (STEP 5, NO), the single chip microcomputer 17 memorizes the current point at the time when the current point stops changing for the predetermined period of time as the reference point RP (STEP 6). In the embodiment, the reference point RP has a positive value different from the value of the target point TP.

In a second embodiment that the following part of the first embodiment is modified, during the casting period PA, the target point TP may be updated when the button 2 is pressed for the first period of time again. For example, the processes may be modified such that when the current point continues to change (STEP 5, YES), the process returns STEP 3 (and STEP 4). In a third embodiment that the following part of the first and/or second embodiments are modified, the single chip microcomputer 17 may send instructions to the buzzer 12 to sound an alarm that indicates completion of memorizing the target point TP in STEP 4. Also note that a variable type of alarm may be used for the starting alarm and/or the alarm that indicates completion of memorizing the target point.

In the embodiments, with respect to the casting period PA that the target point TP is memorized, after rewinding the line, the angler is to position fishing tackle, such as a lure, a hook, or the like in a standard position out of the water. Thus, the reference point is deemed to represent that the fishing elements (the fishing tackle) attached to the end portion of the fishing line are near the fishing rod. Based on such consideration, in the fishing line casting period PB after the casting period PA as shown in FIGS. 6 and 8, the reference point RP is able to be used as an indicator to announce a timing when the angler has to pay attention to prevent fishing tackle such as a lure, a hook, or the like from hitting the fishing rod.

As shown in FIGS. 6 and 8, during the fishing line casting period PB after the casting period PA, the single chip microcomputer 17 continues to detect the current point based on rotational movement of the fishing reel (STEP R1). The single chip microcomputer 17 determines whether the current point is equal to at least one first predetermined value in a state in which the fishing line is being released (STEP R2). When the single chip microcomputer 17 determines that the current point is equal to at least one first predetermined value (STEP R2, YES), the single chip microcomputer 17 sends instructions to the buzzer 12 to sound a first predetermined alarm (e.g., an alarm having a duration of 1 second) (STEP R3).

When the single chip microcomputer 17 determines that the current point is not equal to any of the first predetermined values and/or that the fishing line is not being released (STEP R2, NO), the single chip microcomputer 17 determines whether the current point is equal to the target point TP in a state in which the fishing line is being released (STEP R4). When the single chip microcomputer 17 determines that the current point is equal to the target point TP in a state in which the fishing line is being released (STEP R4, YES), the single chip microcomputer 17 sends instructions to the buzzer 12 to sound an arrival alarm (e.g., an alarm having a duration of 5 seconds) (STEP R5). In a forth embodiment that the following part of the first, second, and/or embodiments are modified, the single chip microcomputer 17 may also send instructions to the buzzer 12 to sound an arrival alarm (e.g., an alarm having a duration of 5 seconds) when the current point is equal to the target point TP in a state in which the fishing line is being rewound.

When the single chip microcomputer 17 determines that the current point is not equal to the target point TP and/or that the fishing line is not being released (STEP R4, NO), the single chip microcomputer 17 determines whether the difference between the current point from the reference point RP is equal to at least one second predetermined value in a state in which the fishing line is being rewound (STEP R6). When the single chip microcomputer 17 determines that the difference of the current point from the reference point RP is equal to at least one second predetermined value in a state in which the fishing line is being released (STEP R6, YES), the single chip microcomputer 17 sends instructions to the buzzer 12 to sound a second predetermined alarm (e.g., an alarm having a duration of 1 second) (STEP R7).

When the single chip microcomputer 17 determines that the difference of the current point from the reference point RP is not equal to any of the second predetermined value and/or that the fishing line is not being rewound (STEP R6, NO), the single chip microcomputer 17 determines whether the difference of the current point from the reference point RP is equal to zero in a state in which the fishing line is being rewound (STEP R8). When the single chip microcomputer 17 determines that the difference of the current point from the reference point RP is equal to zero in a state in which the fishing line is being rewound (STEP R8, YES), the single chip microcomputer 17 sends instructions to the buzzer 12 to sound an alarm for the reference point RP (e.g. 5 second) (STEP R9) and the fishing line casting period PB terminates.

When the single chip microcomputer 17 determines that the difference of the current point from the reference point RP is not equal to zero and/or that the fishing line is not being rewound (STEP R8, NO), the process returns to STEP R2 again. Further, for each following fishing line casting period PB after the fishing line casting period PA when the target point is memorized, the processes shown in FIG. 8 are performed.

The first predetermined alarm(s) can mark timings when a current point is approaching the target point TP, i.e. a lure or a hook is approaching a place where fish are likely to be present in the water. The alarm for the target point TP can mark a timing when the angler has to delicately, carefully pay attention to catch fish.

In many cases, once the angler finds or catches a fish, the angler tries to direct the lure or the hook to the same or near position where the fish were found due to the high possibility of presence of other fish. In such cases, with respect to the fishing line casting(s) after the fishing line casting that the fish were found, the fishing conditions of the angler's position, time of the day, natural environment conditions such as weather, water temperature, etc. are similar to the conditions of the fishing line casting during which the fish were found. Thus, the target point TP is able to be used as an indicator to announce the possibility of presence of fish in the fishing line casting of period PB.

The first predetermined alarm and/or the arrival alarm effectively help anglers to pay more attention at the important timing to take more appropriate actions or strategies to catch fish. For example, the first predetermined alarm and/or the arrival alarm for the target point TP effectively increases the possibility of successful catch of fishes and anglers are able to achieve more excited feeling with respect to the approach.

Also, the arrival alarm for the target point TP which is longer than or distinct from the first predetermined alarms effectively helps anglers to positively realize the sign of any fish. As a result, anglers can enjoy more successful fishing.

During the fishing line casting period PB, in order to find fish, the angler may arbitrarily change the positions, exemplified by positions corresponding to arbitrary point AP2 or AP3 as shown in FIG. 6. Further, there may be cases in which the angler may need a long time and patience until a fish is found. According to the first predetermined alarms and/or the arrival alarm, the angler can be inspired with hope and can maintain their motivation for continuing to search for fish. Therefore, the need for patience to wait for a hit is lessened, and the angler can enjoy a number of trials for finding fish much more than before.

As shown in the embodiment of FIG. 6, the first predetermined values FPV1, FPV2, FPV3 and FPV4 are set as predetermined fixed values in the program of the single chip microcomputer 17. The first predetermined values are appropriately designed depending on the diameters of fishing reels.

The number of the first predetermined values may be designed to be changed. Further, for example, the first predetermined values may be set such that the values represent approximate values roughly corresponding to positions, such as 1 m, 3 m, 5 m, and 7 m, apart from the position that the fish was found. In the embodiments, the first predetermined values are positive values to indicate that the target point TP is approaching. However, in a fourth embodiment that the following part of the first, second and/or third embodiments are modified, the first predetermined values may be negative values to indicate that the target point TP is going away and may include both positive values and negative values. The first predetermined alarm for each positive value may be different from the first predetermined alarm for each negative value.

The second predetermined alarm(s) can mark timings when a current point is approaching the reference point RP, i.e. the fishing tackle and/or one or more fish are approaching the water surface. In other words, the alarm for the reference point RP can mark a timing when the angler has to delicately, carefully pay attention to catch fish as well as a timing when the angler has to pay attention to prevent fishing tackle such as a lure, hook, or the like from hitting the fishing rod.

As shown in the embodiment of FIG. 6, the second predetermined values SPV1, SPV2, SPV3 are SPV4 are set as predetermined fixed values in the program of the single chip microcomputer 17. The second predetermined values are appropriately designed depending on the diameters of fishing reels.

The number of the second predetermined values may be changed. For example, the second predetermined values may be set such that the values represent approximate values roughly corresponding to positions, such as 1 m, 3 m, 5 m, and 7 m, apart from the position of the fishing rod defined by the reference point RP. In a fifth embodiment that the following part of the first, second, third, and/or fourth embodiments are modified, the second predetermined alarm for each second predetermined value may be different from each other and/or from the first predetermined alarm.

In addition, when a fish which is engaged with a lure or a hook is approaching the water surface, delicate operations by the angler are required, since the fish tries to do their best to escape in order not to be caught at the final stage near the water surface.

In conventional fishing, anglers were not able to clearly realize the fish's position before the fish approached the water surface enough to be visible in the water. However, the second predetermined alarms can clearly indicate the position of fish to be caught to anglers regardless the visibility of the fish. Thus, this useful information enables the angler to pay more attention to a fish to take more appropriate actions or strategies in order to positively catch the fish. For example, the angler can prepare a net for scooping up fish and/or carefully operate the rod and/or the fishing reel, or the like. Thus, the second predetermined alarms and the alarm for the reference point RP effectively increases the possibility of successful catching of fish and anglers are able to experience a greater sense of excitement during the approach.

Also, the alarm for the reference point RP which is longer than or distinct from the second predetermined alarms effectively helps anglers to prevent fishing tackle such as a lure, hook, or the like from hitting the fishing rod. As a result, anglers can enjoy more successful fishing with suppressed possibility of damage of the fishing element attached to the end portion of the fishing line and the rod and/or elements provided with the rod.

In the first embodiment, by utilizing the number of the detection signals for determining a current point and setting the first and/or second predetermined values depending on the diameters of fishing reels, more accurate determination of the position of the fishing line becomes possible with a simple configuration.

Note that a variable type of alarm may also be used for the alarm for the starting alarm and the first predetermined alarm, the second predetermined alarm, the arrival alarm, and the alarm for the reference point. Further, the first predetermined alarms for each predetermined value can be different from each other. The second predetermined alarms for each predetermined value can be different from each other.

When the target point has not yet been set, the processes which are shown in FIG. 7 can be performed. For example, once the single chip microcomputer 17 shuts down, the memorized target point may be cleared. Further, the processes which are shown in FIG. 7 can be performed again. In the first embodiment, the single chip microcomputer 17 continues to detect the current point after the button 16 is pressed for the trigger period of time to boot up and until the button is pressed for a termination period of time to terminate the processes.

Further, in a further modified embodiment, each depth of STEP R2 and STEP R4 may be determined regardless of the direction of the fishing line. However, each depth of STEP R2 and STEP R4 may be determined only with respect to one direction in which the fishing line is being either released or rewound. In another embodiment, any calculation method can be applied as long as each comparison of STEP R2 and STEP R4, STEP R6, STEP R8 is substantially possible.

When actually fishing, the line may be unwound to the target position and the line may not be immediately stopped, i.e., the line may continue to be unwound for a period of time even if the alarm sound stops, and the value of the line may be longer than the actual water depth, in which case the reel may be rotated to bring the extra line in and automatically sound when the memory water depth is reached again, thereby informing the angler that the position of the fish group has been reached.

The memorized water depth electronic alarm for a fishing reel of the present disclosure can be adjusted for the memory water depth at any time. When a new memorized water depth (the new target point) has been set, the previously memorized water depth (the previous target point) is automatically canceled, and the convenience of operation is superior.

In addition, the memorized water depth electronic alarm for a fishing reel of the present disclosure has a simple structure, low memory requirements for single-chip microcomputers, which means that small single-chip microcomputers can meet usage requirements, reduce material costs, save resources, protect the environment, and be easier and more convenient to use.

Some embodiments are described below:

Embodiment 1

A memorized water depth electronic alarm for fishing provided with an induction magnet that detects rotation of a fishing reel, and a sensor that receives the rotation of the induction magnet, the memorized water depth electronic alarm for fishing comprising: a first housing, a button, a first circuit board, a second circuit board, a first cover, a second housing, a battery, a single chip microcomputer, at least one seal ring, a second cover, and a buzzer, wherein the button has one end projecting from the first housing through a button mounting hole provided in the first housing, and has the other end connected to the first circuit board, wherein the single chip microcomputer is connected to the first circuit board, wherein after the button, the first circuit board, and the single chip microcomputer are fixed in the first housing, the first cover is assembled to the first housing, wherein the battery is fixed to the second circuit board, wherein the sensor is connected to the second circuit board; the second circuit board, the battery and the sensor are mounted in the second housing; the open side of the second housing is sealed with the second cover, wherein the second circuit board and the first circuit board are connected by one or more data lines, and wherein the buzzer is connected to the first circuit board and assembled to the first housing together with the first circuit board, or alternatively, the buzzer is connected to the second circuit board and assembled together with the second circuit board in the second housing.

Embodiment 2

The memorized water depth electronic alarm for fishing according to embodiment 1, wherein the first seal ring is mounted in a seal groove provided in the first housing and the first seal ring is pressed and fixed into the first housing with screws to form a first assembly.

Embodiment 3

The memorized water depth electronic alarm for fishing according to embodiment 1, wherein the second seal ring is mounted in a seal groove provided in the second housing and the second seal ring is pressed and fixed into the second housing with screws to form a second assembly.

Embodiment 4

The memorized water depth electronic alarm for fishing according to embodiment 3, wherein the shape of the second housing is the same as a shape of the end side of a wire wheel of the fishing reel, and the second assembly is attached to the end side of the wire wheel as a wire wheel cover.

Embodiment 5

The memorized water depth electronic alarm for fishing according to embodiment 1, wherein the induction magnet is disposed on the wire wheel or on a part having a transmission relationship with the wire wheel.

Embodiment 6

The memorized water depth electronic alarm for fishing according to embodiment 1, wherein the battery is connected in parallel with a first capacitor, and is connected to a VCC pin and VSS pin of the single chip microcomputer to supply power to the single chip microcomputer, wherein the sensor includes a first sensor capacitor, a second sensor capacitor, a first sensor reed switch, and a second sensor reed switch, wherein the first sensor reed switch and the second sensor capacitor are connected in parallel with one end thereof being grounded, and the other end thereof connected to a first pin of the single chip microcomputer, wherein the second sensor reed switch and the first sensor capacitor are connected in parallel with one end thereof being grounded, and the other end thereof connected to a second pin of the single chip microcomputer, wherein the sensor receives a detection signal and inputs the detection signal to the single chip microcomputer, and wherein one or more commands are input to the single chip microcomputer by two keys which are respectively connected to a third pin and a fourth pin of the single chip microcomputer.

Although the present invention has been described with reference to the embodiments described above; the technical range of the present invention is not limited to the range described in the above embodiments. Various modifications or improvements can be added to the above embodiments that are apparent to those skilled in the art. Further, embodiments with such changes or improvements can be included in the technical scope of the present invention that are apparent based on the description of the scope of the present invention.

What is claimed is:

1. A method for controlling electronic alarm for a fishing reel, the method comprising the steps of:
    detecting, by a single chip microcomputer provided in the fishing reel, a current point based on rotational movement of the fishing reel;
    determining, by the single chip microcomputer, whether a button provided in the fishing reel is pressed for a first period of time;
    memorizing, by the single chip microcomputer, a current point at a time when the button is pressed for the first period of time as a target point;
    during a fishing line casting period after the fishing line casting period that the target point is memorized, detecting, by the single chip microcomputer, a current point based on rotational movement of the fishing reel;
    determining, by the single chip microcomputer, whether a current point is the target point;
    and sounding an arrival alarm by the buzzer when the current point is the target point.

2. The method according to claim 1, further comprising the steps of:
    after the target point is memorized during the fishing line casting period that the target point is memorized, determining, by the single chip microcomputer, whether a current point stops at a point different from the target point; and
    memorizing, by the single chip microcomputer, a current point at a time when the current point stops at the point different from the target point as a reference point.

3. The method according to claim 2, further comprising the steps of:
    during a fishing line casting period after the fishing line casting period that the target point is memorized, determining, by the single chip microcomputer, whether a current point is at least one first predetermined value in a state in which a fishing line is being released; and
    sounding a first predetermined alarm by the buzzer when the current point is the at least one first predetermined value in a state in which the fishing line is being released.

4. The method according to claim 2, further comprising the steps of:
    during a fishing line casting period after the fishing line casting period that the target point is memorized, determining, by the single chip microcomputer, whether a difference of a current point from the reference point is at least one second predetermined value in a state in which a fishing line is being rewound; and
    sounding a second predetermined alarm by the buzzer when the difference between of the current point from the reference point is the at least one second predetermined value in a state in which the fishing line is being rewound.

5. The method according to claim 2, further comprising the steps of:
    during a fishing line casting period after the fishing line casting period that the target point is memorized, determining, by the single chip microcomputer, whether a difference of a current point from the reference point is zero in a state in which a fishing line is being rewound; and
    sounding an alarm for the reference point by the buzzer when the difference of the current point from the reference point is zero in a state in which the fishing line is being rewound.

6. The method according to claim 1, further comprising the step of:
    prior to the pressing of the button for the first period of time during the same fishing line casting period that the target point is memorized, determining, by the single chip microcomputer, whether the button is pressed for a trigger period of time; and
    when the button is pressed for the trigger period of time, starting to detect a current point by the single chip microcomputer and sounding a starting alarm by the buzzer.

7. The method according to claim 1, wherein
    a current point is determined as a number of detection signals from at least one rotational sensor provided with the fishing reel.

8. An electronic alarm system for a fishing reel comprising:
    a single chip microcomputer with at least one memory;
    at least one sensor capable of converting rotational movements of the fishing reel to at least one electrical detection signal, the at least one sensor electrically coupled with the single chip microcomputer so as to be able to send the at least one electrical detection signal to the single chip microcomputer,
    at least one button electrically coupled with the single chip microcomputer so as to be able to receive at least one operation by a user,
    at least one buzzer electrically coupled with the single chip microcomputer so as to be able to sound at least one alarm in response to at least one instruction from the single chip microcomputer; and
    at least one battery configured to supply the single chip microcomputer and the at least one sensor and the at least one buzzer with electric power,
    wherein the single chip microcomputer is able to:
    detect a current point based on rotational movement of the fishing reel by receiving and analyzing the at least one electrical detection signal from the at least one rotational sensor;
    determine whether a button provided in the fishing reel is pressed for a first period of time;
    memorize a current point at a time when the button is pressed for the first period of time as a target point;
    during a fishing line casting period after the fishing line casting period that the target point is memorized, detect a current point based on rotational movement of the fishing reel;
    determine whether a current point is the target point; and
    send at least one instruction to the buzzer to sound an arrival alarm when the current point is the target point.

9. The electronic alarm system according to claim 8, wherein the single chip microcomputer is further able to:
    after the target point is memorized during the same fishing line casting period that the target point is memorized, determine whether a current point stops in a point different from the target point; and
    memorize a current point at a time when the current point stops at the point different from the target point as a reference point.

10. The electronic alarm system according to claim 9, wherein the single chip microcomputer is further able to:
    during a fishing line casting period after the fishing line casting period that the target point is memorized, determine whether a current point is at least one first predetermined value in a state in which a fishing line is being released; and send at least one instruction to the buzzer to sound a first predetermined alarm when the current point is the at least one first predetermined value in a state in which the fishing line is being released.

11. The electronic alarm system according to claim 9, wherein the single chip microcomputer is further able to:
during a fishing line casting period after the fishing line casting period that the target point is memorized, determine whether a difference of a current point from the reference point is at least one second predetermined value in a state in which a fishing line is being rewound; and
send at least one instruction to the buzzer to sound a second predetermined alarm when the difference of the current point from the reference point is the at least one second predetermined value in a state in which the fishing line is being rewound.

12. The electronic alarm system according to claim 9, wherein the single chip microcomputer is further able to:
during a fishing line casting period after the fishing line casting period that the target point is memorized, determine whether a difference of a current point from the reference point is zero in a state in which a fishing line is being rewound; and
send at least one instruction to the buzzer to sound an alarm for the reference point when the difference of a current point from the reference point is zero in a state in which the fishing line is being rewound.

13. The electronic alarm system according to claim 8, wherein the single chip microcomputer is further able to:
prior to the pressing of the button for the first period of time during the same fishing line casting period that the target point is memorized, determine whether the button is pressed for a trigger period of time; and
when the button is pressed for the trigger period of time, start to detect a current point and send at least one instruction to the buzzer to sound a starting alarm.

14. The electronic alarm system according to claim 8, wherein
a current point is determined as a number of the at least one electrical detection signal from the at least one rotational sensor.

\* \* \* \* \*